(12) United States Patent
Jiang (10) Patent No.: US 9,639,726 B2
(45) Date of Patent: *May 2, 2017

(54) CODE SYMBOL READING SYSTEM HAVING ADJUSTABLE OBJECT DETECTION

(71) Applicant: Hand Held Products, Inc., Fort Mill, SC (US)

(72) Inventor: Ting Jiang, Shanghai (CN)

(73) Assignee: Hand Held Products, Inc., Fort Mill, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/079,589

(22) Filed: Mar. 24, 2016

(65) Prior Publication Data

US 2016/0210487 A1    Jul. 21, 2016

Related U.S. Application Data

(63) Continuation of application No. 13/950,544, filed on Jul. 25, 2013, now Pat. No. 9,297,900.

(51) Int. Cl.
| | | |
|---|---|---|
| *G06K 7/10* | (2006.01) | |
| *G06K 7/14* | (2006.01) | |
| *G01S 17/02* | (2006.01) | |

(52) U.S. Cl.
CPC ........ *G06K 7/10564* (2013.01); *G01S 17/026* (2013.01); *G06K 7/10544* (2013.01); *G06K 7/10722* (2013.01); *G06K 7/1091* (2013.01)

(58) Field of Classification Search
CPC ........... G06K 7/10564; G06K 7/10722; G06K 7/10851; G06K 7/1044; G06K 7/1091; G01S 17/26; G01S 17/026

USPC .......................................................... 235/455
See application file for complete search history.

(56) References Cited

U.S. PATENT DOCUMENTS

| | | | |
|---|---|---|---|
| 5,280,162 | A | 1/1994 | Marwin |
| 5,677,523 | A | 10/1997 | Coleman |
| 5,923,021 | A | 7/1999 | Dvorkis et al. |
| 6,557,764 | B1 | 5/2003 | Reasoner et al. |
| 6,832,725 | B2 | 12/2004 | Gardiner et al. |
| 6,969,003 | B2 | 11/2005 | Havens et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,726,575 | B2 | 6/2010 | Wang et al. |
| 8,196,833 | B2 | 6/2012 | McGill et al. |
| 8,294,969 | B2 | 10/2012 | Plesko |
| 8,317,105 | B2 | 11/2012 | Kotlarsky et al. |
| 8,322,622 | B2 | 12/2012 | Liu |
| 8,366,005 | B2 | 2/2013 | Kotlarsky et al. |
| 8,371,507 | B2 | 2/2013 | Haggerty et al. |
| 8,376,233 | B2 | 2/2013 | Horn et al. |
| 8,381,979 | B2 | 2/2013 | Franz |

(Continued)

FOREIGN PATENT DOCUMENTS

JP    2009193447 A    8/2009

*Primary Examiner* — Laura Gudorf
(74) *Attorney, Agent, or Firm* — Additon, Higgins & Pendleton, P.A.

(57) ABSTRACT

A code symbol reading system is provided. The code symbol reading system has an object detection subsystem that can be configured to detect only those objects that are positioned at a specified distance from the system. The object-detection subsystem thereby initiates the scanning process only when an object is detected at substantially the specified distance from the system.

20 Claims, 4 Drawing Sheets

(56) References Cited

U.S. PATENT DOCUMENTS

| | | |
|---|---|---|
| 8,390,909 B2 | 3/2013 | Plesko |
| 8,408,464 B2 | 4/2013 | Zhu et al. |
| 8,408,468 B2 | 4/2013 | Van Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,556,176 B2 | 10/2013 | Van Horn et al. |
| 8,561,905 B2 | 10/2013 | Edmonds et al. |
| 8,643,717 B2 | 2/2014 | Li et al. |
| 9,297,900 B2 | 3/2016 | Jiang |
| 2009/0134221 A1 | 5/2009 | Zhu et al. |
| 2009/0272804 A1 | 11/2009 | Vinogradov et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0308115 A1 | 12/2010 | Liou |
| 2012/0111946 A1 | 5/2012 | Golant |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0068840 A1 | 3/2013 | Kearney |
| 2013/0070322 A1 | 3/2013 | Fritz et al. |
| 2013/0075168 A1 | 3/2013 | Amundsen et al. |
| 2013/0175341 A1 | 7/2013 | Kearney et al. |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0292474 A1 | 11/2013 | Xian et al. |
| 2013/0306730 A1 | 11/2013 | Brady et al. |
| 2013/0306734 A1 | 11/2013 | Xian et al. |
| 2013/0307964 A1 | 11/2013 | Bremer et al. |
| 2013/0308625 A1 | 11/2013 | Park et al. |
| 2013/0313325 A1 | 11/2013 | Wilz, Sr. et al. |
| 2013/0327834 A1 | 12/2013 | Hennick et al. |

CODE SYMBOL READING SYSTEM HAVING ADJUSTABLE OBJECT DETECTION

CROSS-REFERENCE TO RELATED APPLICATION

The present application claims the benefit of U.S. patent application Ser. No. 13/950,544 for a Code Symbol Reading System Having Adjustable Object Detection filed Jul. 25, 2013 (and published Jan. 29, 2015 as U.S. Patent Publication No. 2015/0028103), now U.S. Pat. No. 9,297,900. Each of the foregoing patent application, patent publication, and patent is hereby incorporated by reference in its entirety.

FIELD OF THE INVENTION

The present invention relates to code symbol readers such as barcode scanners. More particularly, the present invention relates to a code symbol reader having a configurable object detection subsystem.

BACKGROUND

The last few decades have witnessed a dramatic increase in the use of code symbol readers, such as barcode scanners, in business applications. Businesses have particularly gravitated toward the use of code symbol readers in the inventory management and point-of-sale contexts. Code symbol readers are electronic devices that read code symbols, such as barcodes, QR codes, matrix codes, or other computer-readable indicia. Most code symbol readers have a light source, a lens, and a light sensor for converting optical signals into electrical signals. Typically, the light source projects a laser onto the code symbol, which then reflects the light back in an optical signal that is converted by the light sensor into an electrical signal. The electrical signal is then decoded to obtain the information represented by the code symbol.

Broadly speaking, code symbol readers can be divided into handheld code symbol readers and stationary code symbol readers. A user can move a handheld code symbol reader into a position for reading a code symbol affixed to an object. In contrast, the object bearing the code symbol must be moved into a position where it can be scanned by a stationary code symbol reader. Both types of code symbol readers are often encountered at point-of-sale locations in the retail environment. Grocery stores typically employ stationary code symbol readers, over which employees swipe purchased items for scanning at the checkout station. Other retailers often utilize handheld scanners that allow their employees to move the codes symbol reader into position for scanning a code symbol on an object that might not be suitable for passing along a checkout table (e.g., a large and/or heavy object).

With both handheld and stationary code symbol readers, it is often advantageous to initiate the scanning process only when an object bearing a code symbol is present within the code symbol reader's field of view. By only turning on the laser source when an object is within the field of view, for example, the code symbol reader saves power and extends its usable life. Many code symbol readers incorporate object detection techniques to detect when an object is within the field of view of the code symbol reader. When an object is detected, the scanning process is initiated—by powering up the laser, for example. Typically, the code symbol reader continues its scanning operations until a successful scan or until the expiration of a timeout period, whereupon the code symbol reader returns to a standby mode to await the next detection of an object within its field of view.

The object detection feature often has limited configurability. Typically, the user may be able to set the object detection range to either a short setting or a long setting. In the short-range configuration, the scanning process is initiated only when objects are detected that are relatively close to the code symbol reader (e.g., about 5 inches away). In the long-range configuration, the scanning process is initiated only when objects are detected that are relatively far from the code symbol reader (e.g., about 20 inches away). Because code symbol readers may need to scan code symbols that are positioned at distances that may not be congruent with either the short-range or long-range configuration, code symbol readers having this limited ability to configure the object detection feature are often unsatisfactory.

A need exists for a system for reading code symbols that can be customized to detect objects located at varying distances along a continuum of distances from the code symbol reader. A need also exists for a method of configuring the object detection subsystem of a code symbol reader to detect objects at varying ranges from the code symbol reader.

SUMMARY

Accordingly, in one aspect, the present invention embraces a system for reading code symbols. The system includes a code-symbol-capturing subsystem for acquiring information about code symbols within the code-symbol-capturing subsystem's field of view. The code-symbol-capturing subsystem includes a receiving sensor for receiving reflected signals of electromagnetic radiation. The system also includes an object-detection subsystem for detecting the presence of an object within the code-symbol-capturing subsystem's field of view. The object-detection subsystem has an electromagnetic radiation source. The electromagnetic radiation source emits electromagnetic radiation toward an object within the code-symbol-capturing subsystem's field of view. The system also includes a calibration processor for adjusting the electromagnetic radiation source's emission power in response to the reception power of the reflected signals of electromagnetic radiation received by the receiving sensor.

In an exemplary embodiment, the system includes a code-symbol-decoding processor for decoding code-symbol information acquired by the code-symbol-capturing subsystem.

In another exemplary embodiment, the code-symbol-capturing subsystem is an imaging subsystem for capturing images within the imaging subsystem's field of view.

In yet another exemplary embodiment, the imaging subsystem is an imager.

In yet another exemplary embodiment, the code-symbol-capturing subsystem is a laser scanning subsystem for scanning code symbols within the laser scanning subsystem's field of view.

In yet another exemplary embodiment, the electromagnetic radiation source is a light-emitting diode (LED).

In yet another exemplary embodiment, the light-emitting diode (LED) emits infrared electromagnetic radiation.

In yet another exemplary embodiment, the light-emitting diode (LED) emits visible light electromagnetic radiation.

In yet another exemplary embodiment, the light-emitting diode (LED) emits ultraviolet light electromagnetic radiation.

In yet another exemplary embodiment, the calibration processor adjusts the electromagnetic radiation source's emission power until the reception power of the reflected signals of electromagnetic radiation received by the receiving sensor are substantially equal to a predetermined target reception power.

In yet another exemplary embodiment, the receiving sensor is a photodiode.

In yet another exemplary embodiment, the receiving sensor is an image sensor.

In yet another exemplary embodiment, the system includes a hand-supportable housing, wherein the code-symbol-capturing subsystem and object-detection subsystem are disposed within the hand-supportable housing.

In another aspect, the present invention embraces a method for calibrating an object detection subsystem of a code symbol reader. A code symbol reader is provided. The code symbol reader has a code-symbol-capturing subsystem for acquiring information about code symbols within the code-symbol-capturing subsystem's field of view. The code-symbol-capturing subsystem has a receiving sensor for receiving reflected signals of electromagnetic radiation. The provided code symbol reader also has an object-detection subsystem for detecting the presence of an object within the code-symbol-capturing subsystem's field of view. The object-detection subsystem has an electromagnetic radiation source for emitting electromagnetic radiation toward an object within the code-symbol-capturing subsystem's field of view. An object is placed at a specified distance from the code symbol reader and within the code-symbol-capturing subsystem's field of view. Electromagnetic radiation is emitted from an electromagnetic radiation source toward the object. The receiving sensor acquires the reflected signals of electromagnetic radiation. The electromagnetic radiation source's emission power is adjusted until the reflection power of the reflected signals of electromagnetic radiation is substantially equal to a predetermined target reception power. The code-symbol capturing subsystem is configured to acquire information about code symbols within the code-symbol-capturing subsystem's field of view when the reflected power of the reflected signals of electromagnetic radiation is substantially equal to the predetermined target power.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a system for reading code symbols. The term "code symbol" is intended to refer broadly to any machine-readable indicia or device used to store information, including barcodes, linear barcodes, 1D barcodes, matrix barcodes, 2D barcodes, QR codes, RFID tags, and optical character recognition (OCR) symbols. A barcode, for example, is a machine-readable representation of information in a graphic format. The most familiar of these graphic symbols is a series of parallel bars and spaces of varying widths, which gave rise to the term "barcode."

To save power and increase the useful life of its components, code symbol readers (e.g., barcode scanners) often are adapted to detect when an object (e.g., product, package, barcode menu, etc.) is within the code symbol reader's field of view. The code symbol reader will only initiate a scan (e.g., attempt to read a barcode) when an object is detected in the field of view. The system for reading code symbols according to the present invention has an object-detection subsystem for detecting the presence of an object within the code-symbol-capturing subsystem's field of view. The object-detection subsystem can be calibrated so that it only initiates a scan when it detects an object at a specified distance from the system's code-symbol-capturing subsystem. The object-detection subsystem will ignore objects that are not positioned substantially at the specified distance.

Referring now to FIGS. 1 through 4, the system 100 for reading code symbols according to the present invention includes a code-symbol-capturing subsystem 110. The code-symbol-capturing subsystem 110 acquires information about code symbols (e.g., code-symbol information) within the code-symbol-capturing subsystem's field of view 116. The form that the code-symbol information takes depends upon the configuration of the code-symbol-capturing subsystem 110. As will be discussed below, the code-symbol-capturing subsystem 110 may be an imaging subsystem 110A, or it may be a laser scanning subsystem 110B. In some embodiments, the code-symbol-capturing subsystem 110 may include both an imaging subsystem 110A and a laser scanning subsystem 110B. Where an imaging subsystem 110A is employed, the code-symbol information will be a digital image of the code symbol. The digital image may be decoded via image processing techniques (e.g., optical character recognition (OCR) techniques). On the other hand, a code-symbol-capturing subsystem 110 that is a laser-scanning subsystem 110B collects code-symbol information in the form of a reflected optical signal that is converted to an electrical signal. The converted electrical signal may be decoded based upon an analysis of the signal's intensity (i.e., the intensity of the reflected light).

The system 100 for reading code symbols according to the present invention also includes an object-detection subsystem 120. The object-detection subsystem 120 detects the presence of an object 112 within the code-symbol-capturing subsystem's 110 field of view. In this way, the object-detection subsystem acts as a proximity sensor that senses when an object is substantially at a certain distance from the system 100 and within the code-symbol-capturing subsystem's field of view 116. The object-detection subsystem 120 includes an electromagnetic radiation source 125 (e.g., a light source). The electromagnetic radiation source 125 emits electromagnetic radiation (e.g., light) toward an object 112 within the code-symbol-capturing subsystem's 110 field of view 116.

The code-symbol-capturing subsystem 110 has a receiving sensor 118 for receiving reflected signals of electromagnetic radiation. The receiving sensor 118 converts the reflected signals of electromagnetic radiation (e.g., optical signals) into electrical signals that are then processed by the system 100. Typically, the receiving sensor 118 serves the dual purpose of receiving electromagnetic radiation reflected from a code symbol for purposes of decoding the code symbol, and of receiving electromagnetic radiation reflected off of an object 112 (which may bear a code symbol) to determine the presence of an object 112 within the field of view of the code-symbol-capturing subsystem 110. In other words, the receiving sensor 118 is typically involved in both the detection of objects 112 and the acquisition of code-symbol information. Where the code-symbol-capturing subsystem 110 is a laser-scanning subsystem 110B, the receiving sensor 118 is typically a photodiode. In systems 100 that incorporate an imaging subsystem 110A as the code-symbol-capturing subsystem 110, the receiving sensor 118 is typically an image sensor (e.g., charged-couple device (CCD) sensor or complementary metal-oxide-semiconductor (CMOS) sensor).

Typically, the system 100 has two operational modes. In scanning mode, the system 100 actively attempts to acquire code-symbol information for purposes of decoding a code symbol that may be within the field of view 116 of the code-symbol-capturing subsystem 110. It is typically not desirable for the system 100 to continuously attempt to acquire code symbol information. Many handheld scanners, for example, operate on battery power that would be more rapidly depleted by the additional power consumption associated with continuous attempts to acquire code-symbol information (e.g., by continuously sweeping a laser across the field of view of the code-symbol-capturing subsystem). In standby mode, the system 100 delays its attempts to acquire code-symbol information until the occurrence of a triggering event.

The event that triggers the attempt to acquire code-symbol information in the system 100 according to the present invention is the detection of an object 112 in the field of view 116 of the code-symbol-capturing subsystem 110. The object-detection subsystem 120 emits a beam of electromagnetic radiation from the electromagnetic radiation source 125 into the field of view 116 of the code-symbol-capturing subsystem 110. The type of electromagnetic radiation that is emitted may be any type that is suitable for proximity detection, including infrared electromagnetic radiation, visible light electromagnetic radiation, and ultraviolet electromagnetic radiation. To detect the presence of an object 112 within the field of view 116 of the code-symbol-capturing subsystem 110, the system 100 monitors changes in the reflected signal (e.g., the return signal, reflected optical signal) detected by the receiving sensor 118. In general, a reflected signal having more power (e.g., more intensity) indicates the presence of an object 112 within the path of the beam of electromagnetic radiation emitted by the electromagnetic radiation source 125, because more of the electromagnetic radiation is reflected off of the object 112 and back to the receiving sensor 118 than if no object 112 was present.

The nominal range of the object-detection subsystem 120 is the maximum distance at which it can detect the presence of an object 112. Traditional object-detection techniques might associate a triggering event with any substantial change in the reception power of the reflected signals, because any such change would tend to indicate that an object 112 was positioned at some point within the nominal range. The problem with this approach is that it initiates a triggering event when an object 112 is positioned at any point between the system 100 and the nominal range. The traditional approach is too imprecise for many applications. To increase usability of the system 100, it is desirable to allow the user to specify at what distance from the system 100 an object 112 must be positioned to initiate a triggering event (e.g., to initiate scanning mode). For example, if the system 100 is to be used to scan code symbols on objects 112 that are relatively near the system 100 (e.g., within 10 inches), then the user can calibrate the object-detection system 120 to trigger the scanning mode only when an object is positioned substantially near (e.g., about 10 inches from) the system.

The system 100 according to the present invention advantageously permits the user to calibrate the object-detection subsystem 120 so that it will only detect an object that is substantially at a specified distance from the system 100. To achieve this, the system 100 according to the present invention incorporates a calibration processor 127 (e.g., calibration microprocessor). The calibration processor 127 is in communication with the code-symbol-capturing subsystem 110. More specifically, the calibration processor 127 receives electrical signals from the receiving sensor 118 (e.g., electrical signals that were converted from optical signals by the receiving sensor 118). The calibration processor 127 analyzes the electrical signals received from the receiving sensor 118 to determine the power of the reflected optical signals (e.g., the reception power). For example, the electromagnetic radiation source 125 may emit an infrared beam into the field of view 116 of the code-symbol-capturing subsystem 110. The calibration processor 127 analyzes the reflected power (e.g., intensity) of the reflected infrared electromagnetic radiation detected by the receiving sensor 118.

The calibration processor 127 is in communication with the object-detection subsystem 120. More specifically, the calibration processor 127 can adjust the power (e.g., the emission power) of the electromagnetic energy source 125. To calibrate the object-detection subsystem 120 to detect only those objects 112 that are positioned substantially at a specified distance, the user positions an object 112 at the specified distance within the field of view 116 and instructs the system 100 to calibrate (e.g., by pressing a calibration button). The calibration processor 127 analyzes the reception power of the reflected electromagnetic radiation (e.g., the intensity of the electromagnetic radiation being reflected off of the object 112). The calibration processor 127 then adjusts the emission power of the electromagnetic radiation source 125 until the reflected power is substantially equal to a predetermined (e.g., preset, preprogrammed) target reflected power. Typically, an automatic feedback loop is employed to adjust the emission power to the predetermined target reflected power. When the calibration is complete, the electromagnetic radiation source 125 continues to emit a beam of electromagnetic radiation at the adjusted (e.g., calibrated) power. Subsequent to the calibration process, the reflected power of the electromagnetic radiation acquired by the receiving sensor 118 will be substantially equal to the predetermined target reflection power only when an object 112 (e.g., an object having substantially similar reflective properties) is positioned within the field of view 118 substantially at the calibrated distance from the system 100. Consequently, the system 100 will only initiate a scan for code symbols (e.g., trigger the scanning operation, enter scanning mode) when the receiving sensor 118 detects that the reflected power is substantially equal to the predetermined value.

It will be appreciated by a person of ordinary skill in the art that the power of the reflected signal received by the receiving sensor will vary depending on various factors such as scatter and interference. It will therefore be appreciated that the predetermined target reception power may be a range of power values or an average power value.

Until the system 100 is recalibrated, the system 100 will continue to trigger scanning mode only when an object 112 is positioned substantially at the calibrated distance from the system 100 (e.g., at the calibrated distance from the code-symbol detection subsystem 110). To recalibrate the system 100, the user positions an object 112 at the desired distance from the system 100 (e.g., at the recalibrated distance) and repeats the calibration process described above.

Figure 1:
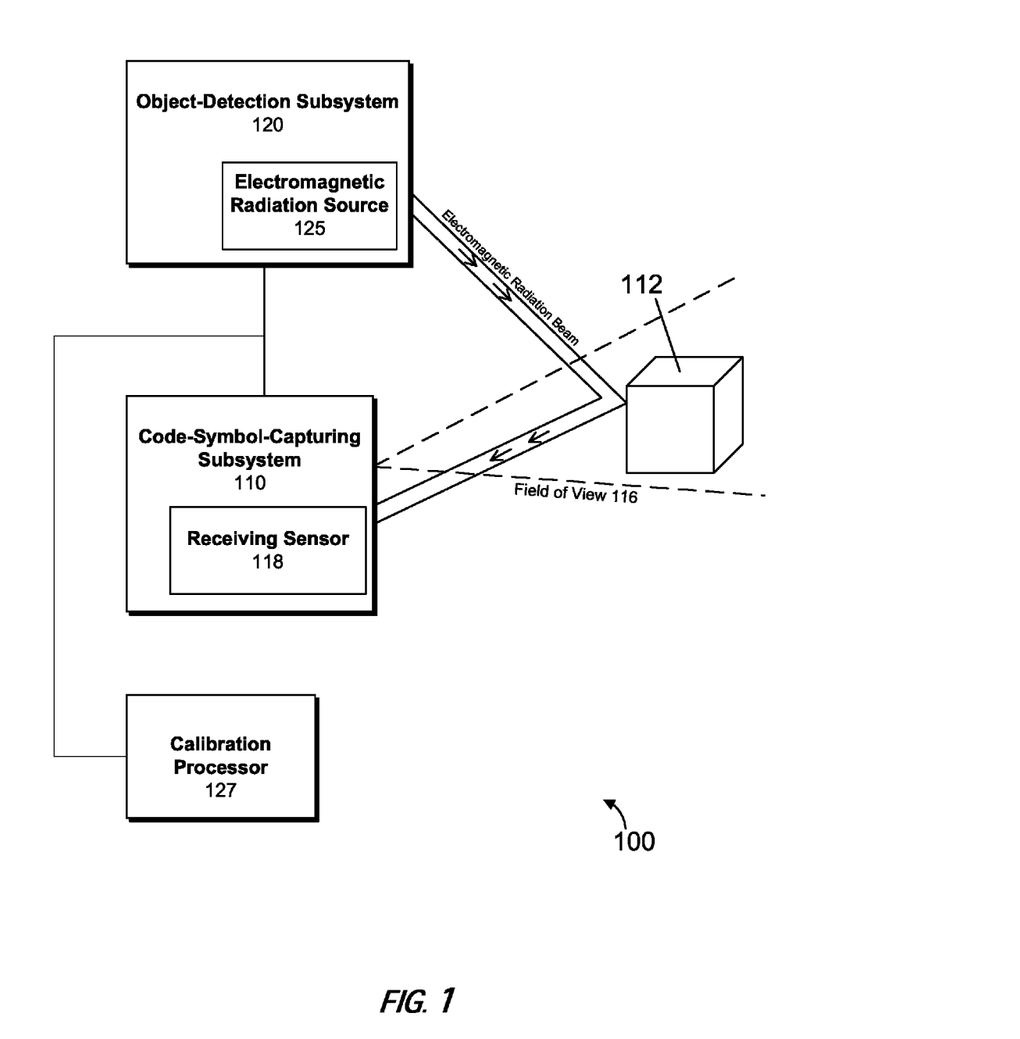
FIG. 1 is a block diagram illustration of an exemplary system for reading code symbols according to the present invention.
Figure 2:
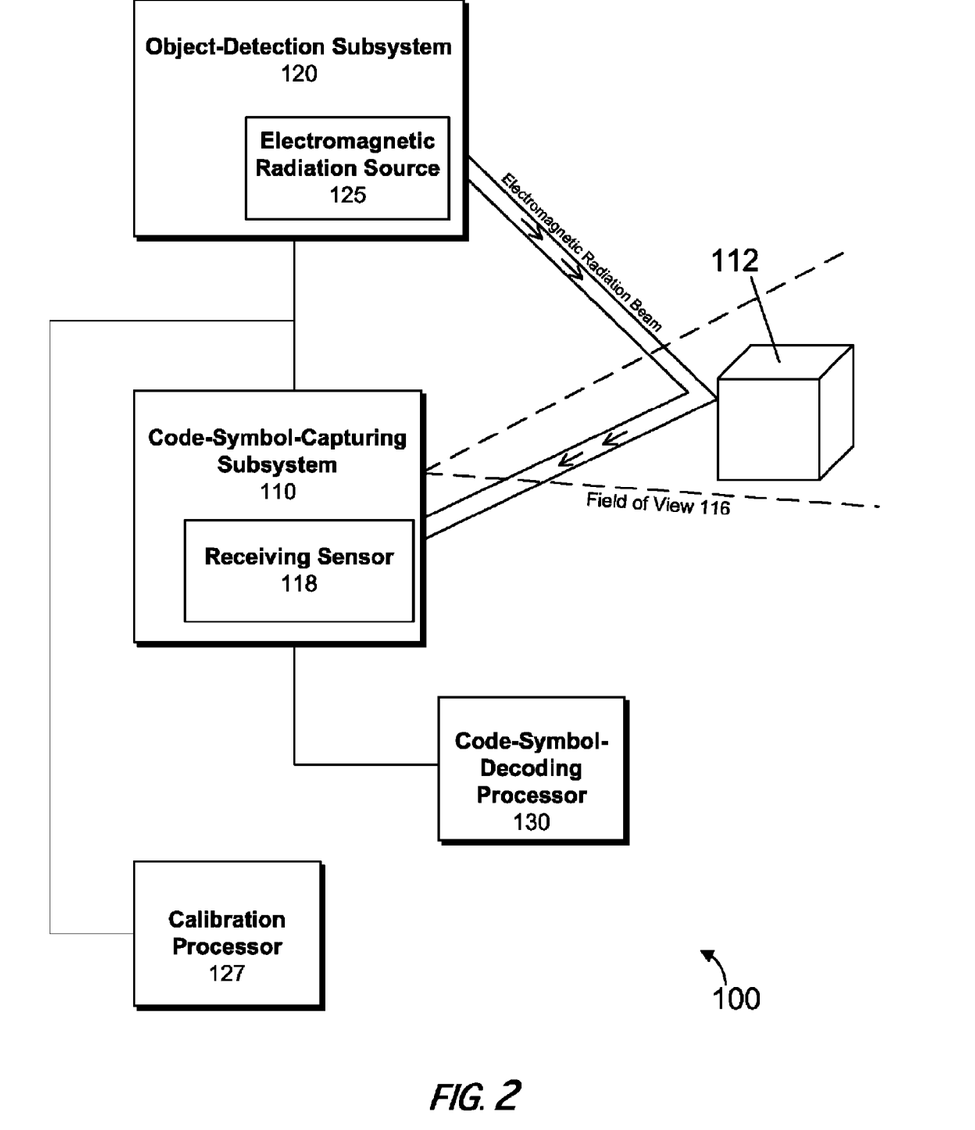
FIG. 2 is a block diagram illustration of a first alternative embodiment of an exemplary system for reading code symbols according to the present invention.

In an alternative embodiment illustrated in FIG. 2, the system 100 includes a code-symbol-decoding processor 130. The code-symbol-decoding processor 130 processes (e.g., decodes, reads) code-symbol information acquired by the code-symbol-capturing subsystem 110. The code-symbol-decoding processor receives the electrical signals (converted from the optical signals acquired by the receiving sensor 118) from the code-symbol-capturing subsystem 110, and converts them to data (e.g., product number, package identification number, etc.).

Figure 3:
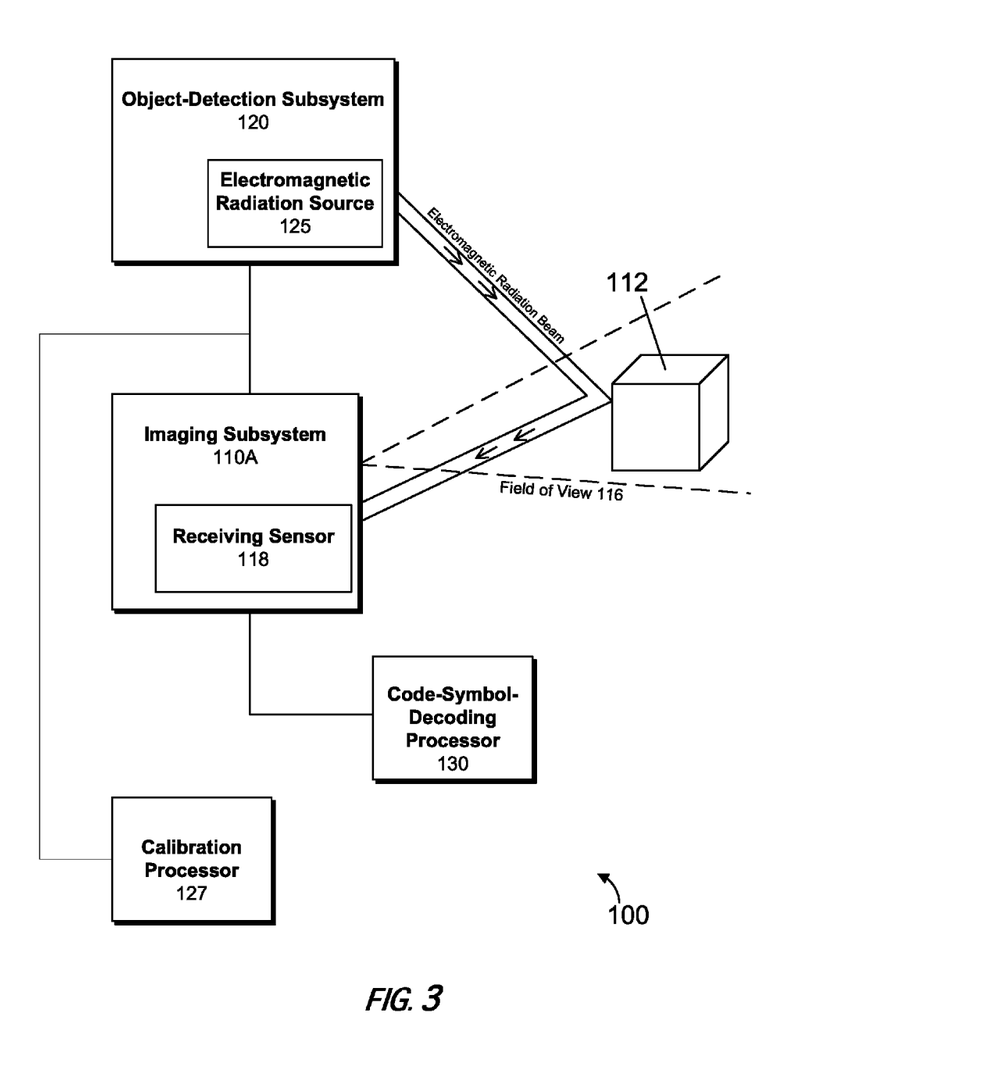
FIG. 3 is a block diagram illustration of a second alternative embodiment of an exemplary system for reading code symbols according to the present invention.

As shown in FIG. 3, in an alternative exemplary embodiment, the code-symbol-capturing subsystem 110 is an imaging subsystem 110A. When triggered by the object-detection subsystem 120, the imaging subsystem 110A acquires code-symbol information by gathering electromagnetic radiation (e.g., visible light) from an object 112 within the imaging subsystem's 110A field of view 116. Typically, the light is gathered through a lens, where it is focused onto an image sensor (e.g., a CCD, CMOS sensor, or any other sensor typically used in a digital imaging device). For example, the camera component of a smartphone device, or any other type of imager, may serve as the imaging subsystem 110A. The image sensor converts the gathered light into a digital image depicting a two dimensional representation of the object 112 within the imaging subsystem's 110A field of view 116. The digital image represents the code-symbol information that is passed on to the code-symbol-decoding processor 130.

Figure 4:
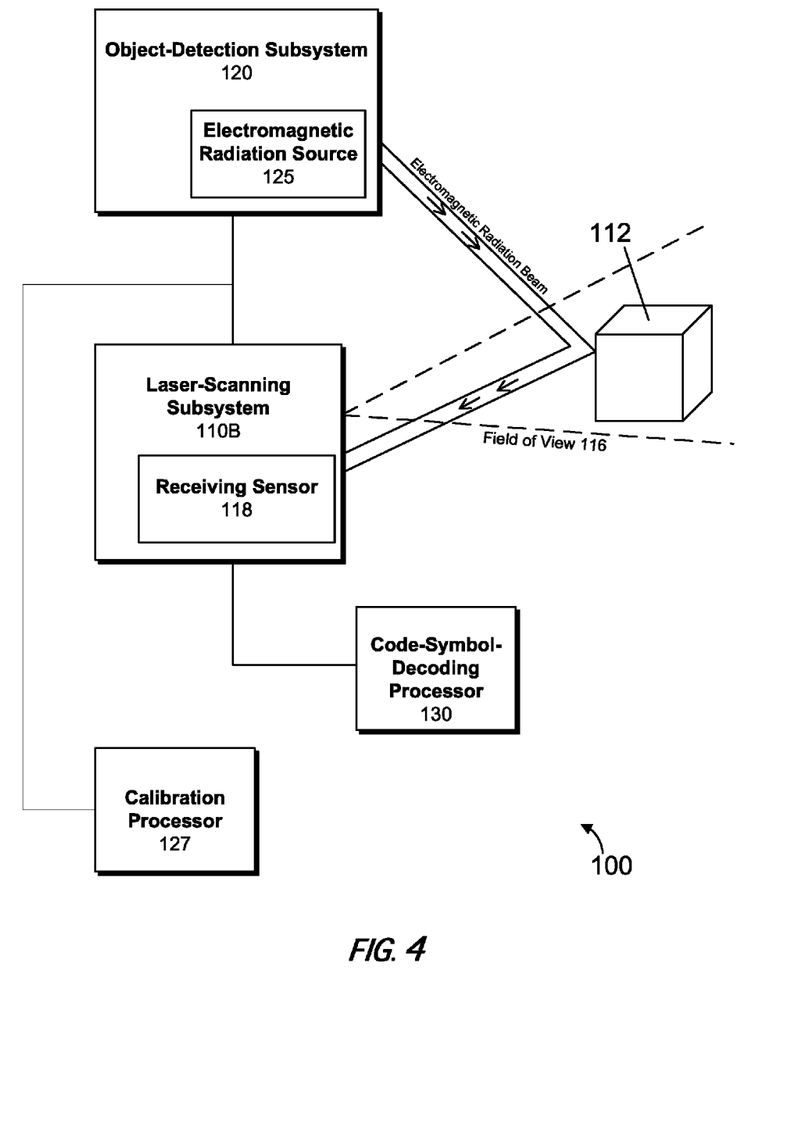
FIG. 4 is a block diagram illustration of third alternative embodiment of an exemplary system for reading code symbols according to the present invention.

As depicted in FIG. 4, another exemplary embodiment of the system 100 according to the present invention has a code-symbol-capturing subsystem 110 that is a laser-scanning subsystem 110B. The laser-scanning subsystem 110B gathers code-symbol information by projecting a beam (e.g., laser beam) from a light source (e.g., laser source, LED source) onto an object 112 within the field of view 116 of the laser-scanning subsystem 110B. Typically, the laser-scanning subsystem 110B then detects the level (e.g., intensity) of reflected light as the light beam sweeps across the code symbol(s) within the field of view 116. Using this technique, the laser-scanning subsystem 110B is able to distinguish between dark areas and light areas on the code symbol (e.g., distinguish between black lines and white spaces that form a barcode). More light is reflected from the light areas on the code symbol than the dark areas, so the optical energy reflected back to the laser scanning subsystem 110B will be a signal containing a series of peaks corresponding to the light areas and valleys corresponding to the dark areas. The laser-scanning subsystem 110B typically uses a photoreceptor (e.g., photodiode) to receive the optical signal reflected from the code symbol, which optical signal represents code-symbol information that can be decoded by the code-symbol-decoding processor 130.

To supplement the present disclosure, this application incorporates entirely by reference the following patents, patent application publications, and patent applications: U.S. Pat. No. 6,832,725; U.S. Pat. No. 7,159,783; U.S. Pat. No. 7,128,266; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); and U.S. patent application Ser. No. 13/947,296 for a System and Method for Selectively Reading Code Symbols, filed Jul. 22, 2013 (Rueblinger et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system, comprising:
a code-symbol-capturing subsystem for receiving reflected electromagnetic radiation from a field of view;
an object-detection subsystem for emitting electromagnetic radiation toward an object within the field of view; and
a calibration processor for adjusting a power of the electromagnetic radiation emitted by the object-detection subsystem in response to a power of the reflected electromagnetic radiation received by the code-symbol-capturing subsystem;
wherein the code-symbol-capturing subsystem acquires information about code symbols within the field of view if the power of the reflected electromagnetic radiation received by the code-symbol-capturing subsystem is substantially equal to a predetermined target reception power.

2. The system according to claim 1, comprising a code-symbol-decoding processor for decoding code-symbol information within the field of view.

3. The system according to claim 1, wherein the code-symbol-capturing subsystem is an imaging subsystem for capturing images within the field of view.

4. The system according to claim 3, wherein the imaging subsystem comprises an imager.

5. The system according to claim 1, wherein the code-symbol-capturing subsystem is a laser-scanning subsystem for scanning code symbols within the field of view.

6. The system according to claim 1, wherein the object-detection subsystem comprises a light-emitting diode (LED).

7. The system according to claim 6, wherein the light-emitting diode (LED) emits infrared electromagnetic radiation.

8. The system according to claim 6, wherein the light-emitting diode (LED) emits visible light electromagnetic radiation.

9. The system according to claim 6, wherein the light-emitting diode (LED) emits ultraviolet electromagnetic radiation.

10. The system according to claim 1, wherein the calibration processor adjusts the power of the electromagnetic radiation emitted by the object-detection subsystem until the power of the reflected electromagnetic radiation received by the code-symbol-capturing subsystem are substantially equal to a predetermined target reception power.

11. The system according to claim 1, wherein the code-symbol-capturing subsystem comprises a photodiode.

12. The system according to claim 1, wherein the code-symbol-capturing subsystem comprises an image sensor.

13. A method, comprising:
placing an object at a given distance from a code-symbol-capturing subsystem and within a field of view of the code-symbol-capturing subsystem;
emitting, with an object-detection subsystem, electromagnetic radiation toward the object;
receiving, with the code-symbol-capturing subsystem, electromagnetic radiation reflected from the field of view;
adjusting a power of the electromagnetic radiation emitted with the object-detection subsystem until a power of the received electromagnetic radiation reflected from the field of view is substantially equal to a predetermined target reception power; and
if a power of the received electromagnetic radiation reflected from the field of view is substantially equal to the predetermined target reception power, acquiring information about code symbols within the field of view with the code-symbol-capturing subsystem.

14. The method of claim 13, wherein the object-detection subsystem comprises a light-emitting diode (LED).

15. The method of claim 14, wherein the light-emitting diode (LED) emits infrared electromagnetic radiation.

16. The method of claim 14, wherein the light-emitting diode (LED) emits visible light electromagnetic radiation.

17. The method of claim 14, wherein the light-emitting diode (LED) emits ultraviolet electromagnetic radiation.

18. The method of claim 13, wherein the code-symbol-capturing subsystem comprises a photodiode.

19. The method of claim 13, wherein the code-symbol-capturing subsystem comprises an image sensor.

20. The method of claim 13, comprising using an automatic feedback loop to adjust the power of the electromagnetic radiation emitted with the object-detection subsystem until the power of the received electromagnetic radiation reflected from the field of view is substantially equal to the predetermined target reception power.

* * * * *